United States Patent [19]
Sudau

[11] Patent Number: 6,006,879
[45] Date of Patent: Dec. 28, 1999

[54] TORQUE CONVERTER WITH A TORSIONAL VIBRATION DAMPER ARRANGEMENT

[75] Inventor: Jörg Sudau, Niederwerrn, Germany

[73] Assignee: Mannesmann Sachs AG, Schweinfurt, Germany

[21] Appl. No.: 09/253,236

[22] Filed: Feb. 19, 1999

[30] Foreign Application Priority Data

Feb. 20, 1998 [DE] Germany .......................... 198 07 223

[51] Int. Cl.[6] .................................................. F16H 45/02
[52] U.S. Cl. ...................... 192/3.29; 192/30 V; 192/207; 464/160
[58] Field of Search .................................. 192/3.28, 3.29, 192/3.3, 30 V, 207; 464/160; 74/572, 574

[56] References Cited

U.S. PATENT DOCUMENTS

| | | | |
|---|---|---|---|
| 4,291,790 | 9/1981 | Staub, Jr. ................................. | 192/3.28 |
| 5,605,210 | 2/1997 | Koike et al. ............................ | 192/3.29 |
| 5,836,217 | 11/1998 | Sudau et al. .............................. | 74/574 |

*Primary Examiner*—Richard M. Lorence
*Attorney, Agent, or Firm*—Cohen, Pontani, Lieberman & Pavane

[57] ABSTRACT

A torque converter has a converter housing which is connectable with a drive shaft, a turbine wheel having a turbine wheel shell and a turbine wheel hub arranged in the converter housing so as to be rotatable about an axis of rotation and which is connectable with a converter driven shaft. A lockup clutch is provided for optional coupling of the turbine wheel with the converter housing. A torsional vibration damper arrangement in a force flow path between the converter housing and the turbine wheel hub, includes the following: a first transmission arrangement, a and second transmission arrangement rotatable about the axis of rotation with and with respect to the first transmission arrangement and with respect to the first transmission arrangement, a coupling arrangement having a torque-transmitting connection with the first transmission arrangement by a first coupling area and a torque-transmitting connection with the second transmission arrangement by a second coupling area. The first coupling area and/or the second coupling area have at least one guide portion contactable with a guide path provided at a respective one of the transmission arrangements and is movable along the guide path during relative rotation between the first transmission arrangement and the second transmission arrangement.

18 Claims, 4 Drawing Sheets

TORQUE CONVERTER WITH A TORSIONAL VIBRATION DAMPER ARRANGEMENT

BACKGROUND OF THE INVENTION

1. Field of the Invention

The present invention is directed to a torque converter and in particular a torque converter comprising a converter housing, a turbine wheel having a turbine wheel hub and shell arranged in the converter housing and preferably comprising a lockup clutch. A torsional vibration damper arrangement is provided between the converter housing and the turbine wheel hub, wherein the torsional vibration damper arrangement comprises a first transmission arrangement, and a second transmission arrangement which is rotatable about an axis of rotation with the first transmission arrangement.

2. Description of the Related Art

It is known to provide a torque converter comprising a converter housing connectable with a drive shaft, a turbine wheel having a turbine wheel shell and a turbine wheel hub arranged in the converter housing so as to be rotatable about an axis of rotation and which is connectable with a converter driven shaft. It is further known to provide a lockup clutch for optional coupling of the turbine wheel with the converter housing such that it is rotation is substantially fixed with respect to each other. Moreover it is known to provide a torsional vibration damper arrangement in a force flow path between the converter housing and the turbine wheel hub, wherein the torsional vibration damper arrangement comprises the following: a first transmission arrangement, a second transmission arrangement which is rotatable about the axis of rotation with the first transmission arrangement and with respect to the first transmission arrangement, a coupling arrangement which has a torque-transmitting connection with the first transmission arrangement by a first coupling area of the coupling arrangement and which has a torque-transmitting connection with the second transmission arrangement by a second coupling area of the coupling arrangement.

In torque converters of the type mentioned above which have a torsional vibration damper arrangement, this torsional vibration damper arrangement is generally constructed so that it has a primary side receiving introduced torque in pull operation and a secondary side which is coupled with the primary side by a plurality of damping springs arranged about the axis of rotation in the circumferential direction. One side of the primary side and secondary side generally forms a hub disk with respective spring windows and control edges for the springs and the other side comprises respective cover disk elements which lie on both sides of the hub disk and have corresponding spring windows and control edges. When torque is introduced, the damping springs are supported at control edges of the hub disk and of the cover disk elements, so that the primary side and the secondary side are rotatable with respect to one another when the damping springs are compressed in the circumferential direction. In this way, rotational vibrations occurring in a drive system are damped in the region of the torque converter.

Torque converters which are constructed in the manner described above have the disadvantage that they have a fixed damping characteristic defined by the spring characteristic of the damping springs. Therefore it is generally extremely difficult, if not impossible, to adapt to different operating states of the drive system in which different rotational vibrations with different frequencies are to be expected. Another problem is that the damping springs can change over the relatively long life of such drive systems because of permanent stressing or loading of the damping springs due to fatigue of their spring characteristic. This can lead to an unwanted change in the damping characteristic of the entire torsional vibration damper arrangement.

SUMMARY OF THE INVENTION

It is an object of the present invention to provide a torque converter with a torsional vibration damper arrangement which has an improved vibration damping behavior, is constructed in a simple manner and is highly reliable in operation.

According to the present invention, the torque converter comprises a converter housing which is connectable with a drive shaft, and a turbine wheel having a turbine wheel shell and a turbine wheel hub. The torbine wheel is arranged in the converter housing so as to be rotatable about an axis of rotation and is connectable with a converter driven shaft. A lockup clutch can also be provided for optional coupling of the turbine wheel with the converter housing such that rotation is substantially fixed between the two. A torsional vibration damper arrangement is provided in a force flow path between the converter housing and the turbine wheel hub. The torsional vibration damper arrangement comprises the following: a first transmission arrangement, a second transmission arrangement which is rotatable about the axis of rotation with the first transmission arrangement and with respect to the first transmission arrangement, and a coupling arrangement which has a torque-transmitting connection with the first transmission arrangement by a first coupling area of the coupling arrangement and which has a torque-transmitting connection with the second transmission arrangement by a second coupling area of the coupling arrangement.

In the torque converter according to the present invention at least one of the first coupling area and the second coupling area have at least one guide portion which is contactable with a guide path for the transmission of torque, this guide path being provided at the transmission arrangement associated with the respective coupling area. The at least one guide portion is movable along the guide path during relative rotation between the first transmission arrangement and the second transmission arrangement.

In this construction of a torque converter, the capability of relative rotation between the respective transmission arrangements, which in this case form a primary side and a secondary side of the torsional vibration damper arrangement, is not enabled by the elastic compression of spring elements or the like as in the prior art; rather, this relative rotation is made possible in that the coupling arrangement which ultimately provides for the torque transmission coupling between the two transmission arrangements is guided at at least one of the transmission arrangements so as to be displaceable. However, since the torsional vibration damper arrangement in its entirety is arranged in a rotating system, centrifugal forces of varying intensity depending on rate of rotation act on the torsional vibration damper arrangement during operation, especially on the coupling arrangement of the torsional vibration damper arrangement. Therefore, the displacing or movement behavior of the coupling area which is movable along a guide path is also influenced depending on the magnitude of the centrifugal force. A desired filtering or damping characteristic depending on the rate of rotation of the system is adjusted by at least one of a specific configuration of the guide path and a specific configuration of the coupling arrangement.

For example, as in one embodiment of the present invention, the guide path has a curved shape with at least one curvature vertex, wherein the at least one curvature vertex forms an at least one local maximum of the radial distance of the guide path from the axis of rotation. In this embodiment, the portion of the coupling arrangement moving on the guide path is displaced radially outward into a region of the curvature vertex as a result of the centrifugal force generated during rotation of the system. As rotational speed increases, the centrifugal force acting on the coupling arrangement also increases. However, as a result of occurring rotational vibrations, the coupling arrangement must be displaced radially inward in the area of contact with the guide path against pretensioning in the radial outward direction caused by the centrifugal force. Depending on the magnitude of the centrifugal force, rotational vibrations of the same intensity lead to a relative rotation of varying intensity of the two transmission arrangements. The torsional vibration damper arrangement of this embodiment is "stiffer" at a high rate of rotation than at a lower rate of rotation, comparable to an increase in a spring constant of a conventional damping spring arrangement with increasing rate of rotation. A damper characteristic of this kind is particularly advantageous because, at relatively low rates of rotation in the range of 1000 RPM or less, the two transmission arrangements are relatively easily rotatable relative to one another and rotational vibrations which are often to be expected in this speed range can accordingly be filtered in an excellent manner.

In another advantageous embodiment of the present invention the guide path is arranged substantially along a plane orthogonal to the axis of rotation.

In the torque converter according to the present invention, the torsional vibration damper arrangement is configured in such a way that every transmission arrangement having a guide path comprises at least one disk part which is arranged substantially orthogonal to the axis of rotation. The guide path is formed at least by a wall defining a recess in the disk part in at least one of the radial direction and circumferential direction.

In a further embodiment of the present invention the coupling arrangement comprises at least one coupling element, wherein each of the first coupling area and the second coupling area of the at least one coupling element has at least one guide portion. In this respect, the first transmission arrangement and the second transmission arrangement, associated with at least one coupling element, each have a guide path. In this configuration, the at least one coupling element is guided at both transmission arrangements by respective guide paths.

Preferably the guide path in the first transmission arrangement and the associated guide path in the second transmission arrangement are formed at least in some areas with a guide path configuration that is not parallel.

In a particularly preferred embodiment of the torque converter according to the present invention, the first transmission arrangement comprises a disk part, and the second transmission arrangement comprises two disk parts which are arranged at both axial sides of the one disk part of the first transmission arrangement and are fixedly connected with one another. The one disk part of the first transmission arrangement has an elongated through-opening which forms the guide path of the first transmission arrangement. Each of the two disk parts of the second transmission arrangement has substantially identically configured elongated recesses or depressions which form a first and second guide path portion of the guide path of the second transmission arrangement. The second coupling area of the at least one coupling element comprises two guide portions situated in the axial direction at both sides of the first coupling area for cooperating with the first guide path portion and with the second guide path portion, respectively. As a result of this configuration being symmetric in the axial direction, no unwanted tilting moments which could impair the functioning of the system are generated by the introduction of torques.

In an alternative embodiment of the present invention the first transmission arrangement has a disk part, and the second transmission arrangement has a disk part, the two disk parts being situated substantially parallel to and opposite one another and having, at least at their sides facing one another, a recess or opening forming a guide path. The at least one coupling element has a first axial end portion which forms the first coupling area with its respective guide portion and has a second axial end portion which forms the second coupling area with its respective guide portion. Since only two disk parts are situated opposite one another in this embodiment, the axial constructional dimensions of the torsional vibration damper arrangement, and therefore also of the torque converter, can be reduced.

Furthermore, in this embodiment it is possible for the first and the second end portion to be offset relative to one another in at least one of the circumferential direction and in the radial direction.

In another alternative embodiment of the torque converter according to the present invention, the coupling arrangement has at least one coupling element which is arranged so as to be swivelable at a transmission arrangement of one of the first and second transmission arrangement and which further has a guide portion for cooperation with a guide path provided at the other of the first and second transmission arrangement. Thus, the at least one coupling element is arranged at one of the transmission arrangements so as to be fixed against displacement but so as to be swivelable and acts at the other transmission arrangement only through contact of the guide portion at the guide path. The same operating functions as those described above are therefore maintained.

The at least one coupling element is preferably elongated and has one end area arranged at one transmission arrangement so as to be swivelable and has the guide portion at its other end area.

In torsional vibration damper arrangements such as those described above, in which a torque is introduced to one of the transmission arrangements, is transmitted via a coupling arrangement to a further transmission arrangement, and is then conveyed again from the further transmission arrangement, there generally arises the problem that the two transmission arrangements are rotatable about axes of rotation which are not exactly aligned with one another because of manufacturing or assembly imprecisions. In this case, as a result of a slight axial offset or a slight relative axial inclination, the two transmission arrangements can carry out a wobbling movement relative to one another during a rotation about the respective axes of rotation. If the coupling between the two transmission arrangements is relatively stiff, constraints which impair the functioning of the torsional vibration damper arrangement may be generated as a result of the wobbling movements. Therefore, according to yet a further embodiment of the present invention, the coupling arrangement couples the first and second transmission arrangement with one another in such a way that they are tiltable relative to one another. By the expression "tiltable relative to one another" it is meant any kind of relative movement between the two transmission arrangements as a result of which these two arrangements no longer lie in parallel planes with respect to one another. When the transmission arrangements are constructed with respective disk parts, this means that, for example, the respective planes defining surfaces of the disk parts facing one another are tilted out of a parallel position with respect to one another because of the induced wobbling movement and therefore intersect one another.

In order to enable this tilting capability, it is preferable that the coupling arrangement is coupled at least with one of the transmission arrangements in the manner of a ball-and-socket joint.

It is possible, alternatively or in addition, that the coupling arrangement is coupled with at least one of the transmission arrangements by elastically deformable connection means.

In order to ensure that the transmission arrangements are acted upon by force in a substantially symmetric manner about the circumferential axis during the transmission of torque, it is preferred that the coupling arrangement comprises a plurality of coupling elements arranged so as to be distributed in the circumferential direction and that a guide path is associated with every coupling element in at least one of the transmission arrangements.

In a further embodiment of the torque converter according to the present invention the guide paths which are associated with coupling elements directly adjacent to one another are connected with one another. An arrangement of this kind is configurable in such a way, for example, that the coupling path associated with a determined coupling element has a curvature vertex which forms a local maximum of the radial distance from the axis of rotation for this area, that the guide path has substantially the same configuration for a directly adjacent coupling element, and that the guide paths are connected in respective portions extending radially inward. The resulting guide path in its entirety is formed by maxima and minima of the radial distance from the axis of rotation which alternate in the circumferential direction. An overload protection is accordingly produced, since the guide portion of the coupling element is initially moved from its local maximum radially inward along the guide path in the direction of the local minimum when relatively strong rotational vibrations are introduced. However, the guide path is not stopped when reaching this minimum as would be the case in guide paths which are separated from one another, but rather enters that area of the guide path which is itself associated with the directly adjacent coupling element. During this movement, each coupling element with its respective guide portions is moved into the area of the respective guide path which is associated with the directly adjacent coupling element.

Alternatively, according to the present invention the torsional vibration damper arrangement is arranged between the turbine wheel shell and the turbine wheel hub, in the force flow path between an element of the lockup clutch and the turbine wheel hub, and in the force flow path between an element of the lockup clutch and the turbine wheel shell.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PRESENTLY PREFERRED EMBODIMENTS

Figure 1:
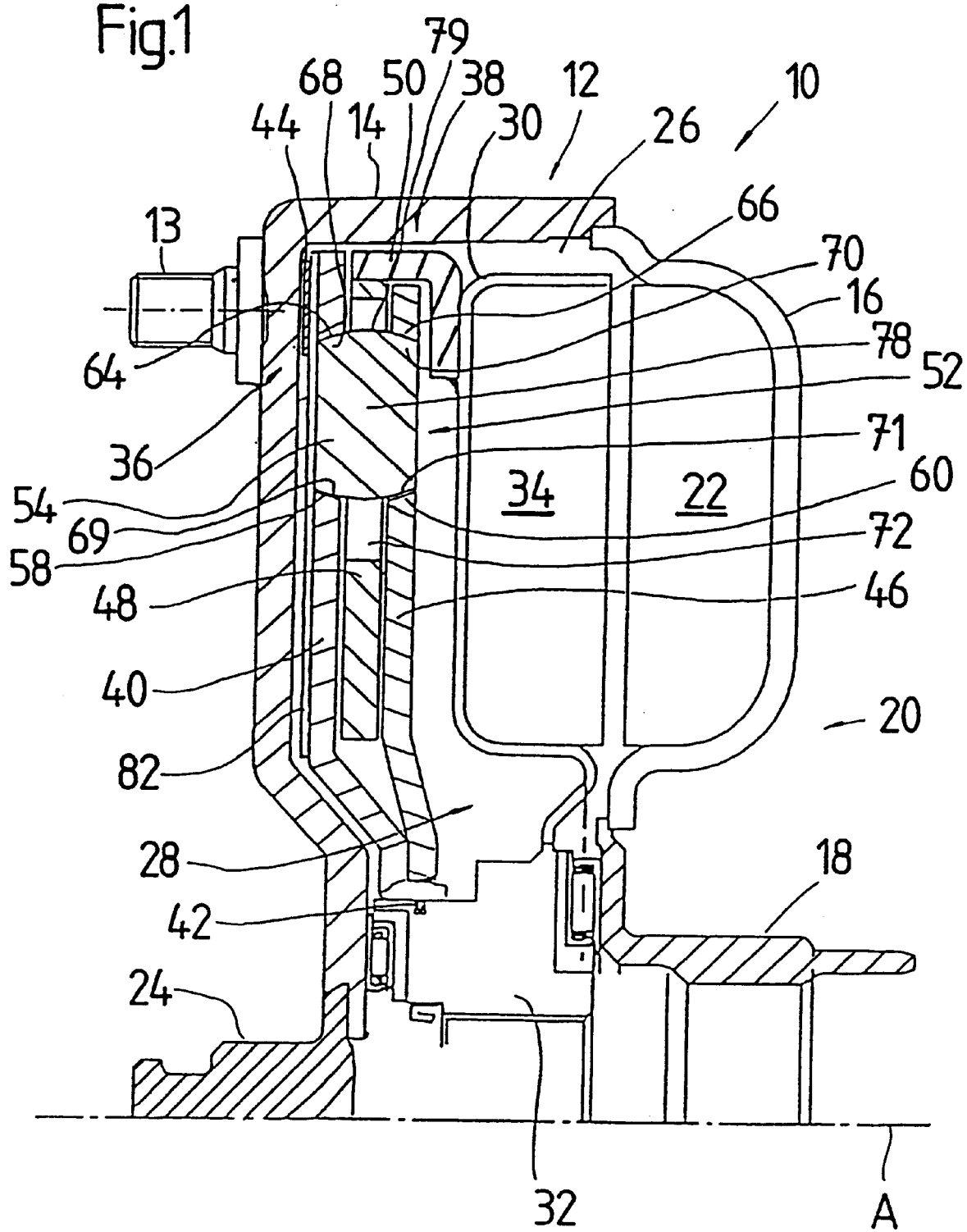
FIG. 1 shows a partial longitudinal section of a torque converter of the present invention in which a torsional vibration damper arrangement acts in a force transmission path between a lockup clutch and a turbine wheel shell.

FIG. 1 shows a partial longitudinal sectional view of a torque converter designated generally by 10. The torque converter 10 comprises a housing 12 which is connectable with a drive shaft of an engine, for example, an internal combustion engine, so as to be fixed with respect to rotation relative to it by a plurality of fastening portions 13, for example, by a flexible plate or the like. The housing 12 has a cover 14 and an impeller wheel shell 16 which is fixedly connected with the cover 14 on the radial outside. This impeller wheel shell 16 is connected in its radial inner area with an impeller wheel hub 18 so as to form an impeller wheel 20. Further, in a known manner the impeller wheel shell 16 carries a plurality of impeller wheel vanes 22 arranged so as to be distributed in a circumferential direction. The cover 14 is fixedly connected in its radial inner area with a cover hub or a centering pin 24 which is received in a corresponding recess of the drive shaft. In a known manner, a turbine wheel 28 is arranged in the interior 26 of the torque converter 10 so as to be rotatable about a converter axis of rotation A with respect to the housing 12. The turbine wheel 28 has a turbine wheel shell 30 which is connected in its radial inner area with a turbine wheel hub 32. The turbine wheel hub 32 is connectable to a gear unit or transmission by means of a converter driven shaft, not shown. The turbine wheel shell 30 has a plurality of turbine wheel vanes 34 which are arranged successively about an axis of rotation A.

Although it is not shown in the drawing, a stator wheel with a plurality of stator wheel vanes is arrangeable axially between the turbine wheel 28 and the impeller wheel 20 so as to be rotatable about the axis of rotation A.

The torque converter 10 shown in FIG. 1 further has a lockup clutch 36 and a torsional vibration damper arrangement 38.

The lockup clutch 36 comprises a clutch piston 40 and which is mounted in its radial inner area, with the intermediary of a sealing O-ring 42, on the turbine wheel hub 32 so as to be rotatable. The clutch piston 40 carries, at its radial outer side, a friction surface or a friction facing 44 which is pressed against an inner surface of the cover 14 in a manner known per se when fluid pressure increases in the interior 26 of the converter. Accordingly, a rotational coupling of the clutch piston 40 to the converter housing 12 and, via the torsional vibration damper arrangement 38 described hereinafter, also rotational coupling of the impeller wheel shell 30, and therefore of the impeller wheel hub 32 which is connected with the impeller wheel shell 30 so as to be fixed with respect to rotation relative to it, to the converter housing 12 is generated.

As can be seen in FIG. 1, the clutch piston 40 forms a part of the torsional vibration damper arrangement 38. In particular, a transmission arrangement of the torsional vibration damper arrangement is formed by the disk-shaped clutch piston 40 together with a disk-shaped part 46 which is arranged at a distance axially from the clutch piston 40 and is fixedly connected with the latter at the radial inside, for example, by welding. A disk-shaped hub part 48 engages axially between the two parts 40, 46 and is connected with the turbine wheel shell 30 so as to be fixed with respect to rotation relative to it on the radial outer side via an angular element 50 so as to form an additional transmission arrangement. The transmission arrangement formed by the hub part 48 will be referred to hereinafter as the first transmission arrangement and the transmission arrangement formed by the clutch piston 40 and the disk-shaped part 46 will be referred to as the second transmission arrangement.

Figure 2:
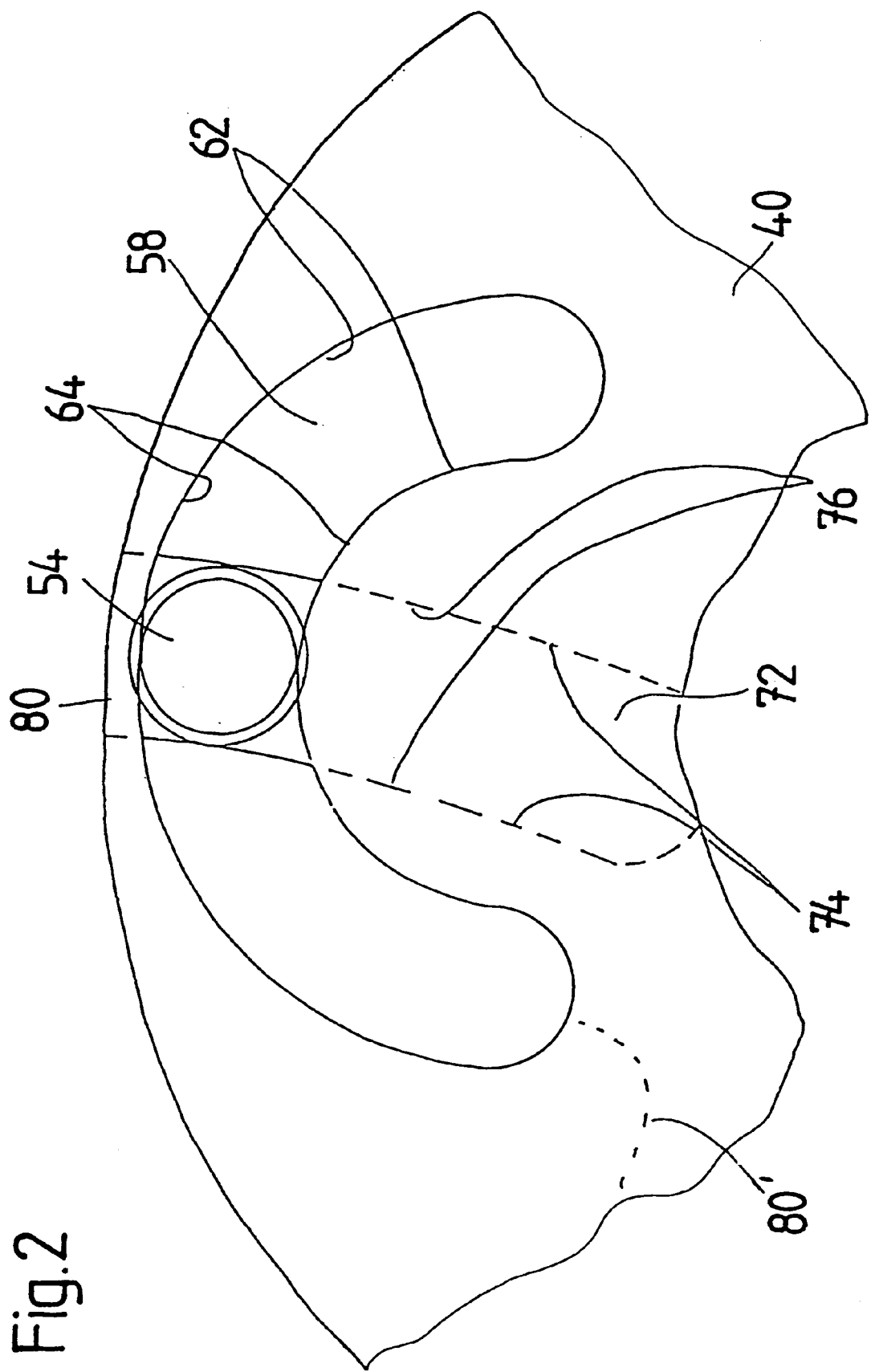
FIG. 2 is an axial view showing the course of respective guide paths for a coupling element in the torsional vibration damper arrangement according to FIG. 1.

It can further be seen in FIG. 1 that a coupling arrangement 52 is provided for torque transmission coupling between the first transmission arrangement 48 and the second transmission arrangement 40, 46. This coupling arrangement 52 comprises a plurality of coupling elements 54 which are distributed in the circumferential direction. Further, a guide path which is associated with each of the plurality of coupling elements 54, and which can be seen more clearly in FIG. 2 is provided in each of the transmission arrangements. A recess 58, 60 having a shape that is shown in FIG. 2 is respectively provided in the clutch piston 40 and the disk-shaped part 46. The recess 58, 60 is open axially, so that the associated coupling element 54 engages axially in the recess 58, 60.

The recess 58, 60 is defined by respective surfaces, wherein surfaces 62 of the recess 58 are shown in FIG. 2. These surfaces 62 form the respective guide paths and guide path portions 64, 66 at the piston 40 and at the disk-shaped part 46. The associated coupling element 54 is guided by its end regions 68, 70 located in the axial direction and by guide portions 69, 71 configured in areas at the guide path portions 64, 66 which together form the guide path of the second transmission arrangement 40, 46. The shape of the guide paths 64, 66 which is shown in FIG. 2 is ultimately determined by the shape of the recess 58 and the recess 60, respectively, so that guidance is provided at a radial inner and radial outer surface defining the recess 58, 60.

Further, an additional recess 72, indicated by dashed lines in FIG. 2, is configured in the hub part 48. The recess 72 has walls 74 which define it and which in turn form a guide path 76 for a middle area 78 of the associated coupling element 54, which middle area 78 is situated in the axial direction between the two end portions 68, 70. In this connection, it is also noted that both walls, designated by 74 in FIG. 2, can again serve as a guide path. However, in the same way it is also possible for the walls 62 and the two walls 74 to be constructed at a distance from one another such that only one of these walls, 62, 74, generally the radial outer wall, contributes to the guidance.

It can be seen in FIG. 2 that the guide paths 64, 66, 76 are constructed so as to cross each other or intersect each other. Due to the fact that the coupling elements 54 are displaced along the guide paths 64, 66, 76 by at least one of a rolling and sliding movement, the torque converter shown in FIG. 1, i.e., its torsional vibration damper arrangement 38, functions in the following manner in rotating operation: first, a state in which essentially no load is to be transmitted beyond the torque converter 10 will be assumed. As a result of rotation, each of the coupling elements 54 is displaced radially outward due to the centrifugal force induced i.e., each of the coupling elements 54 moves in a vertex area 80 of the guide path portions 64, 66, which represents an energy minimum. Further, since each of the coupling elements 54 is guided at the respective guide paths 76 of the hub part 48, the relative rotational position between the hub part 48 and the second transmission parts 40, 46 is accordingly determined. If rotational vibrations leading to a forced relative rotation between the two transmission arrangements should come about proceeding from the position mentioned above, this forced relative rotation during which the coupling element 54 is carried along in the circumferential direction by the guide path or guide paths 76 results in that the coupling element 54 is simultaneously displaced along the guide path and guide path portions 64, 66 away from the vertex area 80. However, this can only be carried out against a resistance of the centrifugal force. This means that the greater the centrifugal force, the greater the resistance against such a displacement of the coupling elements 54 in the associated recesses 58, 60 and therefore the greater the resistance against a relative rotation between the two transmission arrangements 48 and 40, 46. As a result, as the rate of rotation increases and consequently as the centrifugal force increases, the resistance in the torsional vibration damper arrangement 38 against relative rotation of the two transmission arrangements increases, i.e., the torsional vibration damper arrangement 38 becomes "stiffer" as the rate of rotation increases. However, at relatively low rates of rotation during which the coupling element 54 can be deflected radially inward relatively easily against the centrifugal force, a relatively "soft" vibration damper is provided, so that, in particular, the torsional vibrations to be expected in low speed ranges can be damped in an excellent manner.

Due to the shape of the respective guide paths and guide path portions 64, 66, 76, a desired decoupling behavior is achievable. For example, a sharper curvature of the guide path portions 64, 66, 74 results in that even very small relative rotational vibrations produce a relatively strong radial displacement of the coupling elements 54, so that a relatively stiff damper is provided. Guide paths and guide path portions 64, 66, 74 having a shape with relatively slight curvature, i.e., deviation from a circumferential path about the axis of rotation A, results in that virtually no radial displacement of the coupling elements 54 is brought about during a relative rotation between the two transmission arrangements 48 and 40, 46 which results in a correspondingly soft damper. Further, it is possible to provide the guide paths 64, 66, 74 associated with different coupling elements 54 with different contours, so that different damping characteristics can be superimposed in this case. Moreover, it is possible to provide the individual guide paths 64, 66, 74 with a configuration which is not symmetric with respect to the vertex area 80, so that a difference results in the damping characteristic with respect to push operation and pull operation. Further, the guide path portions 64, 66 of directly adjacent coupling elements 54 provided in the second transmission arrangement 40, 46 are connectable with one another, so that there are generated not only vertex areas 80 at maximum radial distance from the axis of rotation A, but also vertex or recess areas 80', indicated by a dashed line in FIG. 2, where there is a minimum distance of the respective guide paths and path portions 64, 66, 74 from the axis of rotation A. The respective coupling elements 54 are then moveable beyond this inner vertex 80', so that excessive rotational variations cannot result in the torsional vibration damper coming to a stop. Accordingly, an overload protection is created. If this connection of the individual guide paths and guide path portions 64, 66, 74 is not provided, it is then advantageous to provide damping elements, for example, elastically deformable stops or the like, in the end regions of the guide paths 64, 66, 74 or in the end regions of at least one of the recesses 58, 60 and 72.

It can further be seen in FIG. 1 that the coupling elements 54 have a barrel-like shape in longitudinal section, wherein the individual guide paths and guide path portions 64, 66 and 76 are preferably contoured in a corresponding manner. The two transmission arrangements 48 and 40, 46 are accordingly connected with one another by coupling elements 54 in the manner of a ball-and-socket joint, so that wobbling movements occurring in this coupling area between these individual transmission arrangements do not lead to a constraining of the coupling elements 54 and so that wobbling movements of this kind are not impeded by an excessively rigid coupling.

It can further be seen from FIG. 1 that a sealing disk 82 is provided at the side of the clutch piston 40 facing away from the interior 26 of the torque converter 10. This sealing disk 82 prevents fluid from passing through the recess 58 and through an intermediate space between the coupling element 54 engaging in the latter and the wall 62 which would impair the functioning of the lockup clutch 36. It is noted that instead of providing the sealing disk 82, at least the recess 58 is constructed in such a way that it does not completely penetrate the clutch piston 40 in the axial direction, but rather forms only a depression.

The damping behavior can also be influenced in that the coupling element 54, is provided with a determined mass. The greater the mass of the coupling elements 54, the stiffer the damper. Therefore when a lesser stiffness is maintained, the coupling elements 54 are produceable from relatively light materials, for example, plastic, aluminum or the like. It is also possible that the coupling elements 54 be configured as hollow parts. If a greater stiffness is to be achieved, relatively heavy material such as steel or the like can be used to produce the coupling elements 54. Further, by means of this specific selection of the mass of the coupling elements 54, the vibration response of the entire damper is impeded, since the mass of the coupling elements 54 must be set in motion by displacement along the guide paths and guide path portions 64, 66, 74 when torsional vibrations occur.

Figure 3:
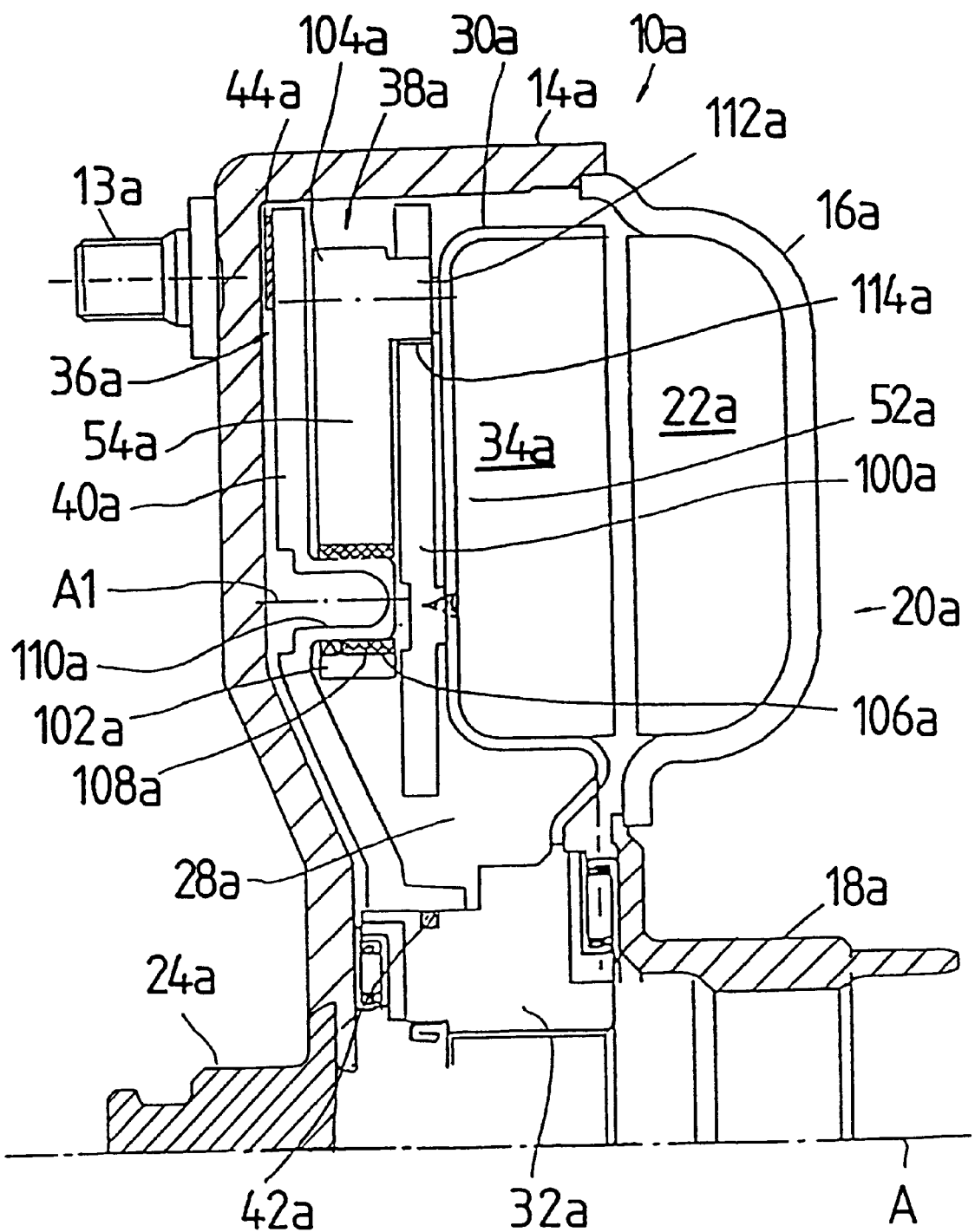
FIG. 3 shows a view, corresponding to FIG. 1, of an alternative embodiment of the torque converter with a torsional vibration damper arrangement, wherein the torsional vibration damper arrangement acts in the force transmission path between the lockup clutch and the turbine wheel shell.
Figure 4:
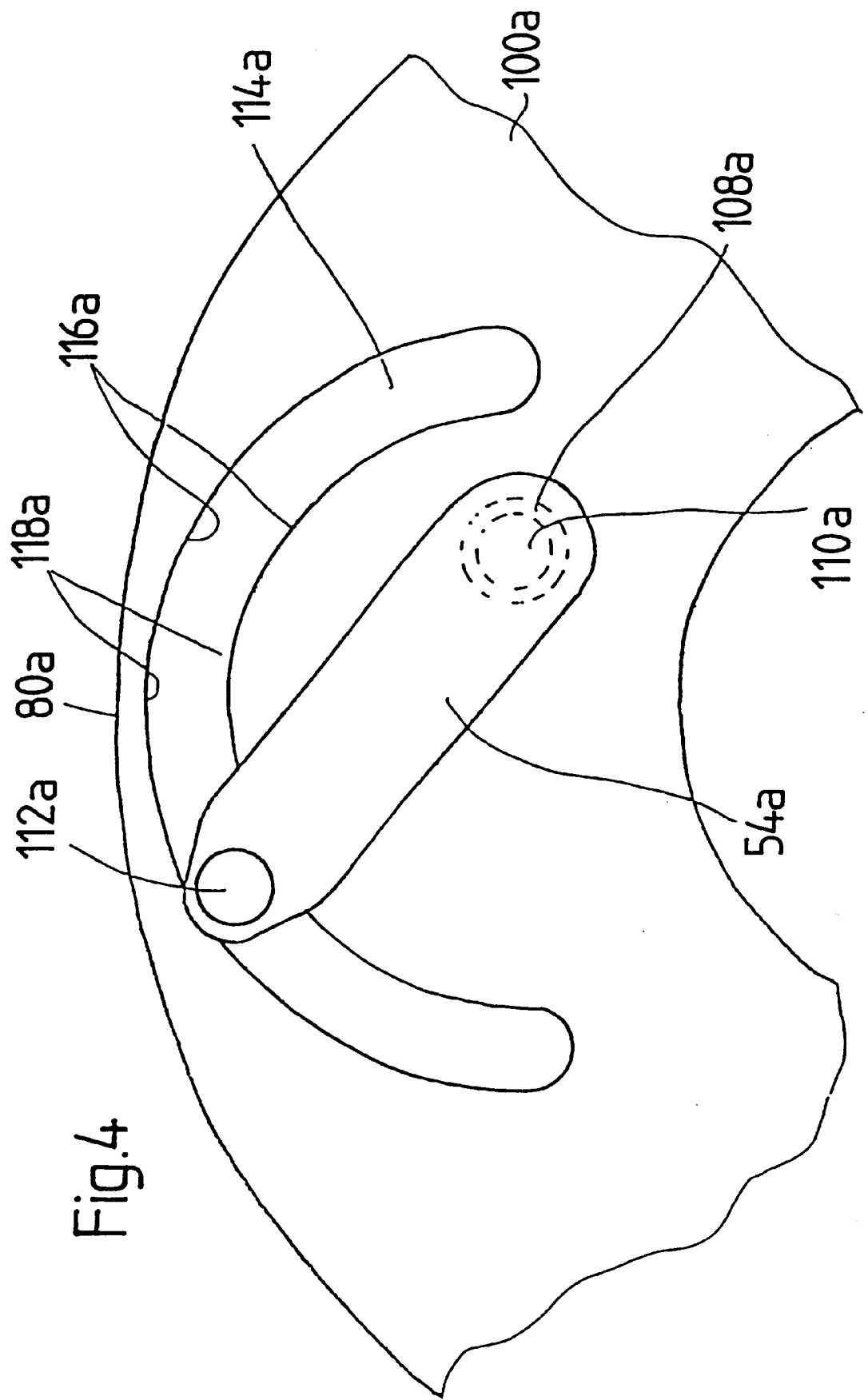
FIG. 4 shows an axial view corresponding to FIG. 2 of the alternative embodiment of the shape of the guide path for a coupling element.

With reference to FIGS. 3 and 4, another embodiment of the torque converter with the torsional vibration damper arrangement of the present invention is described. Components which correspond to the components described above with respect to construction and function are designated by the same reference numbers suffixed with the letter "A-lower case".

The torque converter 10a shown in FIG. 3 also has a torsional vibration damper arrangement 38a which, like that described with reference to FIG. 1, acts in the force transmission path between the lockup clutch 36a, i.e., of a component arrangement, and the turbine wheel shell 30a. The torsional vibration damper arrangement 38a comprises, as a first transmission component, a disk-shaped part 100 which is fixed to the turbine wheel shell 30a by welding or the like and, as a second transmission arrangement, the clutch piston 40a which is located opposite to this disk part 100 a at an axial distance. A plurality of coupling elements 54a again acts between these two transmission arrangements 100a and 40a. However, in the present embodiment these coupling elements 54a are configured as elongated elements which are coupled with the clutch piston 40a in an end area 102a for transmitting torque and are coupled with the disk-shaped part 100a in the other end area 104a for transmitting torque.

The coupling elements 54a have, in end area 102a, an opening 106a in which an annular bearing material 108a is arranged. This annular bearing material 108a is preferably elastically deformable for the following reasons: A bearing projection 110a which is formed at the clutch piston 40a by stamping, welding on or fastening in some other way extends in the annular bearing material 108a. The coupling elements 54a are accordingly swivelable at the clutch piston 40a by means of the annular bearing material 108a and the bearing projection 110a about an axis A1 extending substantially parallel to the axis of rotation A. It is also possible to provide an opening in which a projection is received at the coupling element 54a in a swivelable manner formed in the piston 40a.

In their other end area 104a, the coupling elements 54a have a guide portion 112a extending axially. A recess 114a is formed in the disk-shaped part 100a so as to be engaged by the guide portion 112a. This recess 114a is shown in an axial view in FIG. 4. Walls 116a of this recess 114a again form guide paths 118a which guide the guide portion 112a at its radial inner side and radial outer side, respectively. It is also noted that the recess 114a is configurable in such a way that only one of the guide paths 118a is provided.

The manner of operation of a torsional vibration damper arrangement 38a constructed in the manner described above will be described hereinafter. In rotational operation the coupling element 54a, is swiveled about its swiveling axis A1 due to centrifugal force in such a way that the guide portion 112a is moved in the vertex area 80a of the recess 114a which is substantially circular in the present case or in the guide path 118a. The vertex area 80a again forms a maximum of the radial distance of the guide path 118a from the axis of rotation A. It is also true in this case that the greater the rate of rotation and accordingly the greater the centrifugal force, the more difficult it is to deflect the coupling element 54a from this position of the energy minimum. At the occurrence of torsional vibrations leading to a forced relative rotation between the clutch piston 40a and the disk-like part 100a, the coupling element 54a is compulsorily deflected from the position mentioned above; in this case, the guide portion 112a is moved radially inward along the guide path 118a against the centrifugal force. Thus, depending on the magnitude of centrifugal force and the path shape, a more or less stiff coupling state is provided between the two transmission arrangements 40a and 100a in this case.

As in the embodiment described above, the vibration behavior or decoupling behavior is influenced in the present case by at least one of specific shaping of the guide path 118a and specific distribution of mass of the coupling element 54a. The steeper the course of the guide path 118a in the radial inward direction, the greater the work to be applied per relative rotational angle between the two transmission arrangements 40a, 100a. Further, the same effect is obtainable by increasing the mass of the coupling element 54a in the radial outer area, i.e., in the area of guide portion 112a. The relative positioning between the coupling element 54a and the recess 114a is such that the swiveling axis A1 of the coupling element 54a lies on a radial connection line between the vertex 80a and the axis of rotation A in the rest state in which the coupling element is situated with its guide portion 112a in the area of the vertex 80a. Accordingly, starting from this position, the force initially required to deflect the coupling element 54a is relatively small because the centrifugal force acting on the coupling element 54a is substantially absorbed by the swivelable arrangement at the clutch piston 40a. In a corresponding manner, an arrangement is possible in which there is also a circumferential offset between the guide portion 112a and the axis of rotation A1 during the positioning of the guide portion 112a in the area of the vertex 80a. In this case, there is already a considerable centrifugal force component acting on the guide portion 112a also during the positioning of the guide portion 112a in the area of the vertex 80a; this force component is not absorbed by the swivelable arrangement of the coupling element 54a and must first be overcome during the deflection of the coupling element 54a.

Also, in the embodiment shown in FIGS. 3 and 4, it is advantageous to provide damping stops in the end areas of the recess 114a, so that a smooth stop is achieved during excessive loading of the torsional vibration damper arrangement 38a. This has the further advantage that starting up is achieved without jolts in the startup state in which the coupling element 54a which is initially not forced outward by centrifugal force is movable into the end area.

Furthermore, in the embodiment shown in FIGS. 3 and 4, it is possible to provide guide paths 114a with different shapes for different coupling elements 54a, so that a superposition of different damping characteristics can also be achieved in this case. It is also possible to connect the guide paths of different directly adjacent guide elements 54a, preferably of all guide elements 54a, in their radial inner areas, resulting in a guide path extending in a wavy manner in the circumferential direction. Accordingly, when the damper arrangement is overloaded, all guide portions 112a move in the area of the guide paths of the directly adjacent guide portions; this prevents a stopping of the guide portions 112a.

By mounting the coupling element 54a at the bearing projection 110a by means of the elastically deformable bearing material 108a, a tilting movement of the coupling elements 54a is made possible with respect to the clutch piston 40a and accordingly also a tilting movement of the disk-shaped part 100a with respect to the clutch piston 40a; accordingly, a wobbling movement generated by a slight axial offset or an inclination can occur in operation without constraints being generated in the area of the bearing 110a of the coupling element 54a.

In a further embodiment as shown in FIGS. 3 and 4, at least one of the guide paths 118a is configured in such a way that it is not symmetric in the circumferential direction with respect to the vertex 80a, so that a different damping behavior results depending on the direction in which torque is introduced.

In yet another embodiment, it is also possible to provide a corresponding guide path in the clutch piston 40a instead of the bearing projection 110a, wherein a second guide portion which is provided in the end area 102a of the coupling elements 54a engages in this guide path and is displaceable along it.

A coupling behavior, and therefore a damping behavior, which is adapted to the rate of rotation is achievable by the torsional vibration damper arrangement 38 which is provided in the torque converter 10 according to the present invention and which operates without the damping springs, known per se, and, instead, uses coupling elements 54 that are influenced by centrifugal force. By means of a suitable shape of the respective guide paths and mass distribution or mass of the coupling elements 54, an optimum damping behavior is adjusted for every drive system so as to be adapted to the expected torsional vibrations.

Although the torsional vibration damper arrangement acts 38 between the lockup clutch 36 and the turbine wheel shell 30 in the embodiments of the present invention that have been described above, it is also possible to connect the torsional vibration damper arrangement 38 to the different components in such a way that they act, for example, directly between the lockup clutch 36 and the turbine wheel hub 32 or the turbine wheel shell 30 or the turbine wheel hub 32. In this case, it is only necessary that the different transmission arrangements 48 and 40, 46 are connected with the corresponding components so as to be fixed with respect to rotation relative thereto and, if required, to provide a separate clutch piston 40. In all of these arrangements, the positioning of the torsional vibration damper arrangement 38 in the force flow path between the drive shaft and the driven shaft, i.e., between the housing 12 and the turbine wheel hub 32, is retained.

It is also possible to configure the damper according to the present invention as an after-stage. In this way, the above-described arrangement forms an idling damper which is coupled with a conventional spring idling damper.

The invention is not limited by the embodiments described above which are presented as examples only but can be modified in various ways within the scope of protection defined by the appended patent claims.

I claim:

1. A torque converter, comprising:
   a converter housing connectable with a drive shaft;
   a turbine wheel having a turbine wheel shell and a turbine wheel hub arranged in the converter housing so as to be rotatable about an axis of rotation, the turbine wheel hub being connectable with a converter driven shaft;
   a force flow path in communication with both the converter housing and the turbine wheel hub;
   a torsional vibration damper arrangement located in the force flow path, including a first transmission arrangement, and a second transmission arrangement rotatable about the axis of rotation with the first transmission arrangement and with respect to the first transmission arrangement:
      a coupling arrangement having a first coupling area and a second coupling area, the coupling arrangement being in a torque-transmitting connection with the first transmission arrangement at the first coupling area and in a torque-transmitting connection with the second transmission arrangement at the second coupling area;
      a guide path configured at each of the first transmission arrangement and the second transmission arrangement associated respectively with the first coupling area and the second coupling area; and
      at least one guide portion arranged at at least one of the first coupling area and the second coupling area, the at least one guide portion being contactably movable along the respective guide path during a relative rotation between the first transmission arrangement and the second transmission arrangement so as to transmit a torque.

2. The torque converter according to claim 1, further comprising a lockup clutch arranged so as to couple the turbine wheel with the converter housing such that the turbine wheel is substantially fixed with respect to rotation relative to the converter housing.

3. The torque converter according to claim 1, wherein the guide path has a curved shape including at least one curvature vertex defining an at least one local maximum of a radial distance of the guide path from the axis of rotation.

4. The torque converter according to claim 1, wherein the guide path extends substantially along a plane orthogonal to the axis of rotation.

5. The torque converter according to claim 1, further comprising:
- at least one disk part arranged in each transmission arrangement having the guide path, the at least one disk part being arranged substantially orthogonal to the axis of rotation;
- the guide path being a recess; and
- at least one wall configured at the at least one disk part so as to define the recess in at least one of a radial direction and a circumferential direction.

6. The torque converter according to claim 1, wherein
the coupling arrangement includes at least one coupling element having the first coupling area and the second coupling area, each of the first coupling area and the second coupling area having at least one guide portion, and
the first transmission arrangement and the second transmission arrangement each have an associated guide path contactable with the at least one coupling element at a respective one of the at least one guide portion.

7. The torque converter according to claim 6, wherein the guide path in the first transmission arrangement and the associated guide path in the second transmission arrangement are configured at least in some areas so as not to be parallel.

8. The torque converter according to claim 6, wherein
the first transmission arrangement includes a disk part having two axial sides;
the second transmission arrangement includes two disk parts arranged at both axial sides of the disk part of the first transmission arrangement, the two disk parts being fixedly connected with one another;
the guide path of the first transmission arrangement is an elongated through-opening configured in the disk part of the first transmission arrangement, the two disk parts of the second transmission arrangement having substantially identically constructed elongated recesses defining a respective first and second guide path portion of the guide path of the second transmission arrangement; and
the second coupling area of the at least one coupling element has two guide portions situated in the axial direction at both sides of the first coupling area so as to cooperate respectively with the first guide path portion and with the second guide path portion.

9. The torque converter according to claim 6, wherein
the first transmission arrangement has a disk part;
the second transmission arrangement has another disk part;
the two disk parts are situated substantially parallel to and opposite one another and have, at least at their sides facing one another, at least one of a recess or an opening so as to define the guide path; and
the first coupling area with its respective guide portion is a first axial end portion of the at least one coupling element, and the second coupling area with its respective guide portion is a second axial end portion of the at least one coupling element.

10. The torque converter according to claim 9, wherein the first axial end portion and the second axial end portion are offset relative to one another at least in one of the circumferential direction and a radial direction.

11. The torque converter according to claim 1, wherein the coupling arrangement has at least one coupling element arranged in a swivelable manner at one of the first and second transmission arrangement, a guide path is provided at the other of the first and second transmission arrangement, the coupling arrangement further having a guide portion for cooperating with the guide path.

12. The torque converter according to claim 11, wherein the at least one coupling element is elongated and is arranged in a swivelable manner at an end area of one of the first and second transmission arrangement and the guide portion is arranged at another end area of the one of the first and second transmission arrangement.

13. The torque converter according to claim 1, wherein the coupling arrangement couples the first and the second transmission arrangement with one another so as to be tiltable with respect to one another.

14. The torque converter according to claim 13, wherein the coupling arrangement is coupled at least with one of the transmission arrangements as a ball-and-socket joint.

15. The torque converter according to claim 13, wherein the coupling arrangement is coupled at least with one of the transmission arrangements by elastically deformable connection means.

16. The torque converter according to claim 1, wherein the coupling arrangement comprises a plurality of coupling elements arranged so as to be distributed in the circumferential direction, and in at least one of the transmission arrangements a respective guide path is associated with each of plurality of coupling elements.

17. The torque converter according to claim 16, wherein the guide paths associated with directly adjacent coupling elements of the coupling arrangement, are connected with one another.

18. The torque converter according claim 1, wherein the torsional vibration damper arrangement is arranged at least in one of the force flow path between the turbine wheel shell and the turbine wheel hub, the force flow path between an element of the lockup clutch and the turbine wheel hub, and in the force flow path between an element of the lockup clutch and the turbine wheel shell.

* * * * *